April 16, 1940. L. J. MOST Re. 21,428

MECHANICAL PENCIL

Original Filed July 15, 1939 2 Sheets-Sheet 1

INVENTOR
L. J. Most
BY
B Jopp
his ATTORNEY

April 16, 1940. L. J. MOST Re. 21,428

MECHANICAL PENCIL

Original Filed July 15, 1939 2 Sheets-Sheet 2

INVENTOR
L. J. Most
BY
his ATTORNEY

Reissued Apr. 16, 1940

Re. 21,428

UNITED STATES PATENT OFFICE 21,428

MECHANICAL PENCIL

Lucifer J. Most, Arlington, N. J.

Original No. 2,177,839, dated October 31, 1939, Serial No. 284,653, July 15, 1939. Application for reissue February 3, 1940, Serial No. 317,219

21 Claims. (Cl. 120—18)

The object of the invention is to provide a wholly enclosed interiorly threaded member for engaging a lead directly, and positioned between aligning lead guides of such cross-section that it permits a lead to move longitudinally in said guides while preventing it from turning, the said member and guides being revoluble relatively to one another, but the member and the guides are prevented from longitudinal movement relative to one another with means for turning relatively the lead guides and the threaded member.

Another object of the invention is to provide a simple mechanism formed of few moving parts, for propelling, retracting, expelling and automatically presenting a new lead to writing position.

In the appended drawings forming part of this application,

Figure 1:
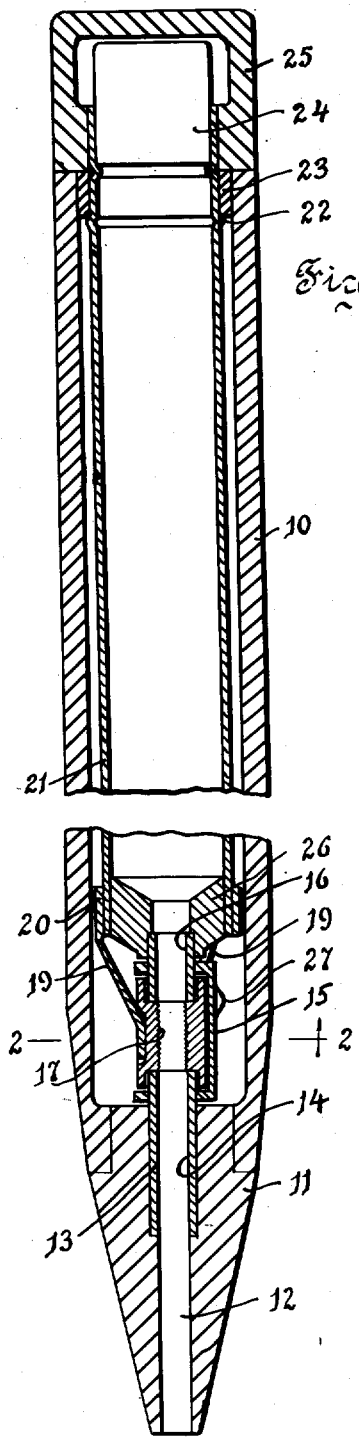
Figure 1 is a fragmentary vertical section on line 1—1, Figure 2 of a pencil embodying one form of my invention, the lead being removed to better illustrate the invention.

Referring to the drawings, 10 is a barrel which is provided with a customary tip 11, and it is made rigid with the barrel. The tip has a lead passage 12 of angular cross section corresponding to the prismatic shape of a lead 9 used therein. In this particular case it is triangular in cross-section. The lead passage 12 in the upper part of the tip is enlarged to form a housing for a tubular lead guide 13, the inner bore 14 of which is substantially the same in size and cross-section as that of the lead passage 12. This lead guide 13 is anchored in the tip. Positioned on the lead guide and anchored thereto above the tip 11 is one end of a yoke 15. The other end of the yoke carries a second lead guide 16 in spaced relation with the lead guide 13 and in alignment therewith. The yoke holds the two guides in fixed relation.

A threaded member 17 is positioned in the space between the lead guides 13 and 16 to revolve relatively thereto, but prevented to move longitudinally of said guides. Preferably, the threaded member 17 is recessed at its ends to engage the proximate ends of the lead guides 13 and 16 respectively. This engagement of the threaded member with the lead guides provides the necessary bearings for said threaded member on which it may turn. As will be noted, the threaded member is also located to turn within the yoke 15.

The threaded member 17 has on its lateral surface a plurality of recesses 18, each engaged by a corresponding yielding arm 19, the said arms extending from a ring 20, with which they form a spider with yielding arms. The ring is secured to the lower end of a tube 21 extending past the end of the barrel remote from the tip.

The tube 21 has an exterior bead 22 which bears against a ring 23 positioned within the barrel 10. This ring, although it permits the rotation of the tube 21, in the barrel, prevents the longitudinal displacement of said tube within the barrel. The tube 21 carries an eraser 24 and a cap 25, by which it may be revolved in either direction. Positioned in the tube 21 to move therewith is a washer 26 recessed at its end to provide a bearing for the upper end of the lead guide 16.

As will be seen three arms 19 are shown in engagement with the threaded member 17. In revolving the tube 21 for actuating the lead 9, the spider arms 19 are constrained to revolve with the tube 21, that is, the magazine. As any of the arms 19 strikes the upright of the yoke 15, at a stationary cam 27 provided on the upright, it is forced out of engagement with the corresponding recess 18 of the threaded member. Therefore, while there is one arm disengaged from the threaded member passing in the back of the upright of the yoke 15, the other two members are still in engagement and continue to revolve the threaded member, and when the disengaged arm has passed the upright of the yoke, it snaps back into the corresponding recess. It, therefore, will be apparent that at no time during the manipulation of the driving mechanism, can there be more than one arm 19 disengaged with the threaded member 17, and the action is identical no matter in which direction the magazine is revolved.

In revolving the threaded member 17, the lead 9 is engaged directly by it as it passes from the magazine through the stationary guide 16. The threaded engagement of the member 17 with the lead 9, causes the lead to move longitudinally of the threaded member, the lead being prevented from turning by the guides 14 and 16. Although in the turning movement of the threaded member by the magazine there may be one of the yielding arms uncoupled from the threaded member, there are always two other arms still coupled to rotate it so that at no time is there a complete uncoupling between the magazine and the threaded member. Each yielding arm of the spider may be considered to be a separate coupling means for independently coupling and uncoupling the threaded member 17 with the magazine formed by the tube 21.

Figure 3:
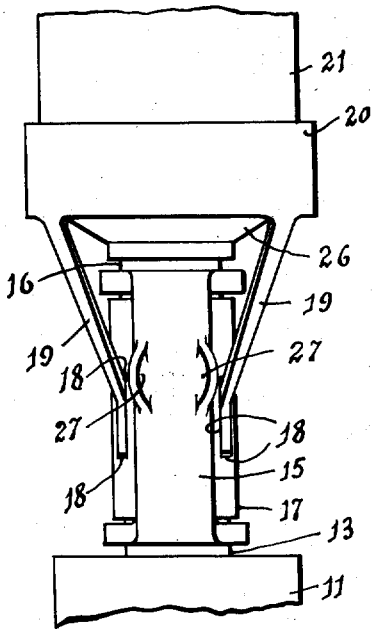
Figure 3 is an elevation of the mechanism for actuating the lead in the pencil, as illustrated in Figure 1.
Figure 2:
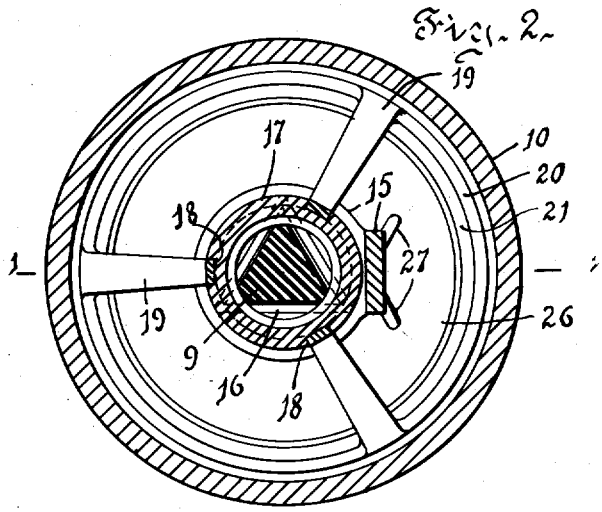
Figure 2 is an enlarged cross-section on line 2—2, Figure 1.
Figure 7:
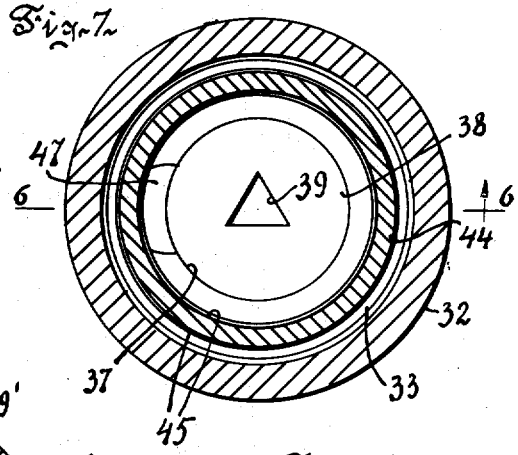
Figure 7 is an enlarged cross-section on line 7—7, Figure 6.
Figure 5:
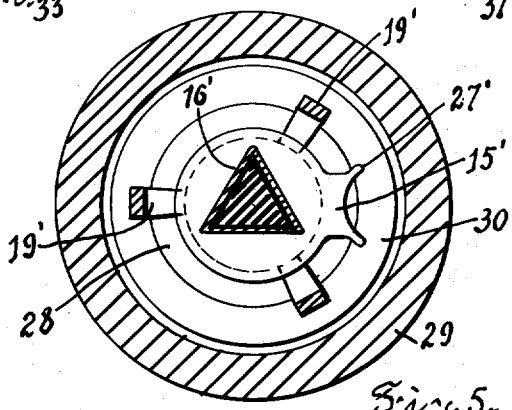
Figure 5 is an enlarged cross-section on line 5—5, Figure 4.
Figure 6:
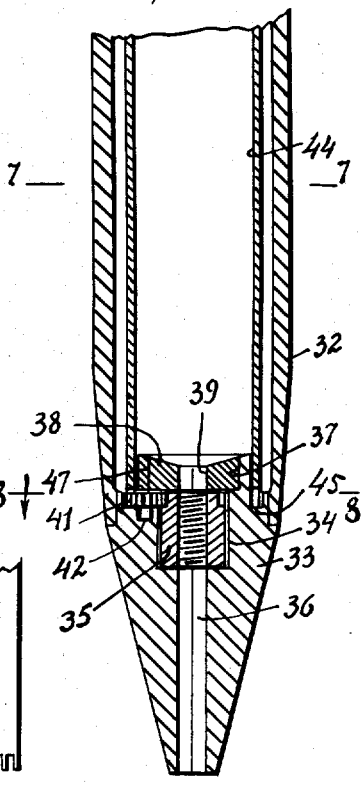
Figure 6 is a vertical section of a lower part of a pencil outline on line 6—6, Figure 7, showing a further modification.
Figure 4:
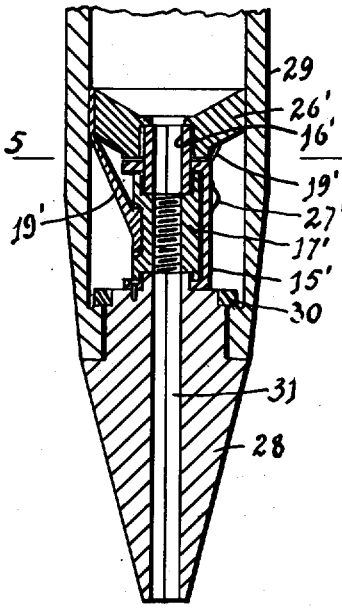
Figure 4 is a vertical section of the lower part of a mechanical pencil showing a modified structure.
Figure 9:
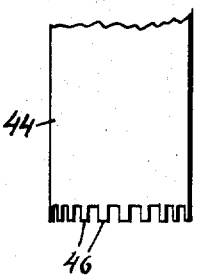
Figure 9 is a fragmentary side elevation of an inner tubular part of the device shown in Figure 6.

In the modification shown in Figures 4 and 5 inclusive, the tip 28 is revoluble relatively to the barrel 29. It is prevented from longitudinal displacement relative to the barrel by a washer 30, which forms a retainer for the tip in the barrel. The passage 31 in the tip is of angular cross-section and forms the guide for the lead. The yoke 27' is secured with one end thereof to the tip 28 to move therewith. The other end of the yoke carries the upper lead guide 16', which is aligned with the passage 31 and of the same size in contour and in cross-section. The interiorly threaded member 17' is positioned within the yoke and bears on the end of the guide 16' and the end of the tip, that are housed in the corresponding ends of the threaded member 17'. Thus, the threaded member and the lead guides are relatively revoluble, but prevented from moving longitudinally. The yielding arms 19' engage the threaded member 17' in the same manner as described with reference to Figures 1 to 3 inclusive, but in place of having a ring joining them, they are preferably set in the washer 26' which in this particular case is anchored in the barrel 29. The guide 16' is revoluble in the washer 26'.

In the arrangement shown in Figures 4 and 5 when the tip 28 is revolved, the yoke 27 revolves therewith, and, therefore, the lead guide 16'. The yielding arms 19' will, therefore, be stationary relatively to the guides and the threaded member engaged by them. Therefore, a lead carried by the lead guide 16' will revolve therewith and be threaded through the threaded member 16' and through the lead guide passage 31. During the rotation of the yoke there will always be two yielding arms in engagement with the threaded member while one is being disengaged by a cam 27' provided on the yoke for the purpose. It is evident that the operation is identical with that described for Figures 1 to 3 inclusive, except that in this particular case, the yoke is revolved in place of revolving the threaded member, as described in reference to Figures 1 to 3 inclusive.

The modification shown in Figures 6 to 9 inclusive, shows a barrel 32 provided with a tip 33 which is anchored in the barrel. The tip has a recess 34 for a threaded member 35 to revolve therein. The bore of the threaded member aligns with a passage 36 in the tip, the passage being of angular cross-section and forms a lead guide. The tip above the recess 34 is an enlarged recess 37 to receive a washer 38 to be anchored therein. The washer 38 has a passage 39 of similar cross-section as the passage 36 and in alignment therewith. This passage in the washer forms with the passage 36 the spaced lead guides between which the interiorly threaded member 35 is positioned.

Figure 8:
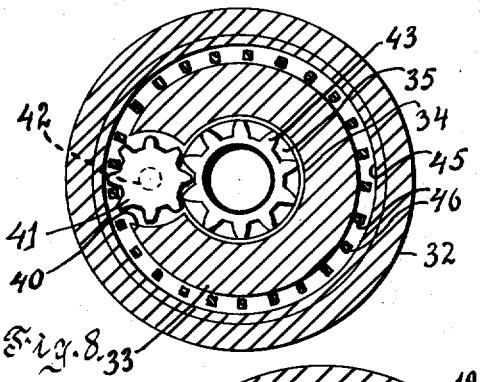
Figure 8 is a similar cross-section on line 8—8, Figure 6.

In addition, the tip 33 on one side of the recess 34 near the top has a recess 40 which houses a pinion 41, the trunnion 42 of which bears in the tip so that the pinion can freely rotate in the recess. The pinion 41 is engaged with an exterior gear 43 formed in the body of the threaded member 35. Positioned within the barrel to revolve therein is a tube 44 housing the washer 38 and revoluble relative thereto. The lower end of the tube bears in an annular recess 45 formed in the tip 33. This annular recess 45 merges with the recess 40 for the pinion, so that the teeth 46 formed on the lower end of the tube 44 engage the tip of the pinion 41, as best shown in Figure 8. In revolving the tube 44, the pinion is revolved, and, therefore, the interiorly threaded member 35.

To provide a smooth bottom for the magazine formed by the tube 44 and the washer 38, a key 47 is positioned in the recess left in the tip between the tube 44 and the washer 38.

In all these structures illustrated and described, the interiorly threaded member is enclosed wholly in the barrel and is positioned between the spaced aligning lead guides of such cross-section that it permits a lead to move longitudinally in said guides while preventing the lead from turning therein with either the guides of the threaded member being revoluble relative to one another, while prevented from moving longitudinally, with means for revolving relatively, the threaded member and lead guides from an end of the barrel, as distinguished from the lateral access of the threaded member for the manipulation of same.

I claim:

1. In a mechanical pencil, a barrel, aligning spaced lead guides of angular cross-section in the barrel, an interiorly threaded member positioned between the guides and wholly within the barrel to turn relatively to the guides, but prevented from moving longitudinally thereof, and means to turn relatively the guides and the threaded member.

2. In a mechanical pencil, a barrel, aligning spaced lead guides of angular cross-section in the barrel, an interiorly threaded member positioned within the guides to turn relatively to the guides, but prevented from moving longitudinally thereof, and means to turn relatively the guides and the threaded member from an end of the barrel.

3. In a mechanical pencil, a barrel, aligning spaced lead guides of angular cross-section in the barrel, an interiorly threaded member positioned between the guides and wholly within the barrel, and means to turn relatively the guides and the threaded member from an end of the barrel.

4. In a mechanical pencil, a barrel having a magazine for leads, spaced lead guides from the magazine having means inherent to the shape of the guides for preventing a lead from turning therein while permitting the lead to move longitudinally in said guides, an interiorly threaded member positioned between the guides, said guides and threaded member being relatively revoluble but prevented from moving longitudinally, a plurality of yielding means, each independently coupling the magazine to the threaded member, and means for revolving relatively the threaded member and lead guides from an end of the barrel.

5. In a mechanical pencil, a barrel having a magazine for leads, spaced lead guides from the magazine having means inherent to the cross-sectional contour of the guides for preventing a lead from turning therein while permitting the lead to move longitudinally in said guides, an interiorly threaded member wholly within the barrel and positioned between the guides, said guides and threaded member being relatively revoluble but prevented from moving longitudinally of one another, a plurality of yielding means, each normally coupling the magazine to the threaded member, and each adapted to independently uncouple the magazine from the threaded member when meeting an obstruction in the path of its movement, and means for revolving relatively the threaded member and the guides from an end of the barrel.

6. In a mechanical pencil, a barrel having magazine for leads in the barrel, spaced lead guides from the magazine, a yoke for maintaining said lead guides in fixed spaced relation, said guides having means inherent to the cross-sectional shape of the guides adapted to prevent the lead from turning therein while permitting it to move longitudinally, an interiorly threaded member positioned between the guides to revolve relatively thereto, but prevented from moving longitudinally thereof, a plurality of yielding means coupling the threaded member to the magazine, with each of said yielding means being adapted to clear the yoke independently, and means for revolving the yoke and the threaded member relatively to one another.

7. In a mechanical pencil, a barrel, a magazine for leads revoluble in the barrel, spaced lead guides from the magazine having means inherent to the shape of the guides for preventing the lead from turning therein while permitting the lead to move longitudinally in said guides, an interiorly threaded member positioned between the guides to revolve relatively thereto, but prevented from moving longitudinally thereof, and a plurality of yielding means, each independently coupling the magazine to the threaded member.

8. In a mechanical pencil, a barrel, a magazine for leads revoluble in the barrel, spaced lead guides from the magazine having means inherent to the cross-sectional contour of the guides for preventing the lead from turning therein while permitting the lead to move longitudinally, a threaded member positioned between the guides to turn relatively to the guides, but prevented from moving longitudinally thereof, and a plurality of yielding means, each normally coupling the magazine to the threaded member, and each adapted to independently uncouple the magazine from the threaded member when meeting an obstruction in the path of its movement.

9. In a mechanical pencil, a barrel, a magazine for leads revoluble in the barrel, spaced lead guides from the magazine, a yoke for maintaining said lead guides in fixed spaced relations, said guides having means inherent to the cross-sectional shape of the guides adapted to prevent a lead from turning therein while permitting it to move longitudinally, a threaded member positioned between the guides to revolve relatively thereto but prevented from moving longitudinally thereof, and a plurality of yielding means coupling the threaded member to the magazine, each of said yielding means adapted to clear the yoke independently.

10. In a mechanical pencil, a barrel, a magazine for leads revoluble in the barrel, spaced lead guides of angular cross section from the magazine, a yoke for maintaining the guides in fixed spaced relation, a threaded member positioned between the guides to revolve relatively thereto but prevented from moving longitudinally thereof, a spider having yielding arms coupling the magazine to the threaded member, and whereby the threaded member is revolved.

11. In a mechanical pencil, a barrel having a lead outlet, a pair of lead guides of angular cross section, a yoke spacing and aligning the guides in the barrel and with the outlet, a magazine revoluble in the barrel for feeding leads to the guides, a threaded member for engaging a lead directly positioned between the guides revoluble relatively thereto but prevented from moving longitudinally thereof, and a spider having yielding arms, each coupling the magazine to the threaded member.

12. In a mechanical pencil, a barrel having a lead outlet, a pair of aligning spaced lead guides of angular cross section in the barrel for directing leads through the outlet of the barrel, a yoke engaging said guides for maintaining the same in a fixed relation, a threaded member for engaging the lead directly positioned between the guides and revoluble relatively thereto but prevented from moving longitudinally of said guides, a magazine for feeding leads to the guides, and a plurality of yielding coupling means from the magazine to the threaded member, each of said yielding coupling means being adapted to disengage the magazine from the threaded member as it comes in contact with the yoke.

13. In a mechanical pencil, a barrel having a lead outlet, a pair of aligning spaced lead guides of angular cross section in the barrel for directing leads through the outlet of the barrel, a yoke engaging said guides for maintaining the same in a fixed relation, a threaded member for engaging the lead directly positioned between the guides and revoluble relatively thereto but prevented from moving longitudinally of said guides, a tube revoluble in the barrel, a washer in said tube secured thereto and forming a bearing for the proximate end of the lead guide, and forming with said tube and washer a magazine for leads, and a spider having yielding arms secured to said tube to move therewith, each of said arms of the spider engaging the threaded member, and each adapted to independently engage and disengage said threaded member when a spider arm encounters the yoke.

14. In a mechanical pencil, a barrel, a lead magazine revoluble therein, spaced lead guides of angular cross section from the magazine, an interiorly threaded member wholly within the barrel positioned between the guides and revoluble relatively to said guides but prevented from moving longitudinally thereof, an exterior gear constrained to revolve with the threaded member a gear associated with the magazine, and a pinion interposed between the gear of the magazine and the gear of the threaded member.

15. In a mechanical pencil, a barrel, spaced lead guides of angular cross section positioned within the barrel, an interiorly threaded member wholly positioned within the barrel and mounted rotatively between the guides but prevented from moving longitudinally thereof, an exterior gear formed on the threaded member, a tube revolubly mounted in the barrel and having teeth formed at the lower end thereof, a pinion meshing with the teeth of the tube and the gear of the threaded member, and a washer secured to the upper guide and positioned within the tube and forming therewith a magazine for leads.

16. In a mechanical pencil, a barrel having a tip provided with a lead passage of angular cross section, an interiorly threaded member revolubly mounted in the tip and in alignment with the passage, a tube revolubly mounted within the barrel and bearing on the tip with its lower end, a washer positioned within the tip above the threaded member and having a passage of angular cross-section in alignment with the passage in the tip, and means within the tip interposed between the threaded member and the tube so that the threaded member will be revolved when the tube is revolved.

17. In a mechanical pencil, a barrel having a magazine for leads, spaced lead guides of angular cross section from the magazine, a yoke for maintaining the guides in fixed spaced relation, an interiorly threaded member positioned between the guides to revolve relatively thereto but prevented from moving longitudinally thereof, yielding arms coupling the magazine to the threaded member, and means for revolving the yoke.

18. In a mechanical pencil, a barrel having a tip revoluble relatively thereto, said tip having a passage of angular cross section forming a lead guide, a yoke carried by the tip to move therewith, a lead guide carried by the yoke in spaced relation with the passage of the tip and in alignment therewith, an interiorly threaded member positioned between the passage and the lead guide, a washer in the barrel positioned above the yoke and forming with a barrel a magazine for leads, and yielding arms associated with the washer and engaging the threaded member for preventing the same from turning when the yoke is turned by the turning of the tip.

19. In a mechanical pencil, a barrel, aligning spaced lead guides in the barrel having means inherent to the shape of the guides for preventing a lead from turning therein while permitting the lead to move longitudinally in said guides, an interiorly threaded member positioned between the guides and wholly within the barrel to turn relatively to the guides but prevented from moving longitudinally thereof, and means to turn relatively the guides and the threaded member.

20. In a mechanical pencil, a barrel, aligning spaced lead guides in the barrel having means inherent to the cross-sectional contour of the guide adapted to prevent a lead from turning therein while permitting the lead to move longitudinally in said guide, an interiorly threaded member positioned between the guides and wholly within the barrel, and means to turn relatively the guides and the threaded member from an end of the barrel.

21. In a mechanical pencil, a barrel, a lead magazine revoluble therein, spaced lead guides from the magazine having means inherent to the shape of the guide for preventing a lead from turning therein while permitting the lead to move longitudinally in said guides, an interiorly threaded member wholly within the barrel positioned between the guides and revoluble relatively to the said guides but prevented from moving longitudinally thereof, an exterior gear constrained to revolve with the threaded member, a gear associated with the magazine, and a pinion interposed between the gear of the magazine and the gear of the threaded member.

LUCIFER J. MOST.